United States Patent Office 3,294,707
Patented Dec. 27, 1966

3,294,707
PREPARATION OF HYDROCARBON
CONVERSION CATALYSTS
Ernest L. Pollitzer, Hinsdale, and Dennis J. Ward, Lombard, Ill., assignors to Universal Oil Products Company, Des Plaines, Ill., a corporation of Delaware
No Drawing. Filed Mar. 4, 1964, Ser. No. 349,482
4 Claims. (Cl. 252—438)

This invention relates to a process for the preparation of hydrocarbon conversion catalysts. More specifically the invention is concerned with an improved process for preparing hydrocarbon conversion catalysts, and particularly polymerization catalysts, whereby the desired catalysts possess a greater conversion activity than catalysts which have been prepared in a conventional manner.

It is therefore an object of this invention to provide a process for preparing hydrocarbon conversion catalysts which will possess an effective conversion activity.

Another object of this invention is to provide an improved process for the preparation of catalytic compositions of matter which possess relatively high conversion activity when utilized in a dimerization process involving olefinic hydrocarbons.

In a broad aspect one embodiment of this invention resides in a process for the preparation of a hydrocarbon conversion catalyst which comprises promoting a substantially anhydrous, high surface area alumina support by impregnation with a compound selected from the group consisting of the salts and hydroxides of the alkali metals and alkaline earth metals, calcining the resultant promoted support, thereafter impregnating said promoted support with an alkali metal amide dissolved in an excess of liquid ammonia, removing excess ammonia at an elevated temperature and pressure, and recovering the catalyst comprising an alkali metal amide disposed on a promoted substantially anhydrous, high surface area alumina support.

A further embodiment of this invention is found in a process for the preparation of a hydrocarbon conversion catalyst which comprises promoting a substantially anhydrous gamma-alumina support by impregnation with a compound selected from the group consisting of the salts and hydroxides of the alkali metals and alkaline earth metals, calcining the resultant promoted support, thereafter impregnating said promoted support with an alkali metal amide dissolved in an excess of liquid ammonia, removing excess ammonia at an elevated temperature and pressure, and recovering the catalyst comprising an alkali metal amide disposed on a promoted substantially anhydrous gamma-alumina support.

Another embodiment of this invention is found in a process for the preparation of a hydrocarbon conversion catalyst which comprises promoting a substantially anhydrous gamma-alumina support by impregnation with a compound selected from the group consisting of the salts and hydroxides of the alkali metals and alkaline earth metals, calcining the resultant promoted support, thereafter impregnating said promoted support with a potassium amide dissolved in an excess of liquid ammonia, removing excess ammonia at an elevated temperature and pressure, and recovering the catalyst comprising a potassium amide disposed on a promoted substantially anhydrous gamma-alumina support.

A specific embodiment of this invention resides in a process for the preparation of a hydrocarbon conversion catalyst which comprises promoting a substantially anhydrous gamma-alumina support by impregnation with a compound selected from the group consisting of the salts and hydroxides of the alkali metals and alkaline earth metals, calcining the resultant promoted support, thereafter impregnating said promoted support with a potassium amide dissolved in an excess of liquid ammonia, removing excess ammonia at a temperature in the range of from about 35° to about 100° C. and at a pressure in the range of from about 200 to about 400 p.s.i., and recovering the catalyst comprising a potassium amide disposed on a promoted substantially anhydrous gamma-alumina support.

Other objects and embodiments will be found in the following further detailed description of this invention.

As hereinbefore set forth the present invention is concerned with an improved process for preparing hydrocarbon conversion catalysts whereby the finished catalyst will possess a higher activity as concerns the hydrocarbon conversion, and particularly polymerization or dimerization, of olefinic hydrocarbons, than will catalysts which have been prepared in a conventional manner. The conversion catalysts which are prepared according to the process of this invention comprise an alkali metal amide disposed on a promoted metal oxide support. The term "promoted," as used in the present specification and in the appended claims, will refer to a pretreatment of the metal oxide support with a salt or hydroxide of a metal selected from the group consisting of alkali metals and alkaline earth metals such as lithinum, sodium, potassium, rubidium, cesium, magnesium, calcium, strontium and barium, said salts and hydroxides including lithium hydroxide, lithium nitrate, sodium hydroxide, sodium nitrate, potassium hydroxide, potassium nitrate, magnesum hydroxide, etc. Of the alkali metal amides which are composited or disposed on the promoted metal oxide support, potassium and sodium are preferred inasmuch as said metals exhibit substantially more activity than do other metals of the alkinous metal group (i.e., the group comprising alkali metals and alkaline earth metals) and potassium is especially preferred for the same aforesaid reason. In addition to their high activity, these two metals are preferred from an economic standpoint inasmuch as said metals are relatively more plentiful and correspondingly less expensive to use.

In preparing such catalysts the alkali metal amides are disposed on a support in a quantity ranging from about 2 to about 20% or more by weight based on the support. The preferred supports which are utilized in the process of the present invention are those which are relatively or substantially free from water. In most cases this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support and, in addition, depending upon whether the water is in a combined or merely in a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from absorbed water is not a satisfactory support for the alkali metal amides in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram and which has been freed from adsorbed water and which contains little combined water is a satisfactory support. Celite, a naturally occurring mineral, after precalcination, is not a satisfactory support. Celite has a surface area of from about 2 to about 10 square meters per gram. Likewise, alkali metal amide dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion, the limitation on the use of any particular support is one of freedom from combined or adsorbed water in combination with the surface area of the support selected. In addition to the aforementioned types of support, another type is that which is prepared from an alkali aluminate such as sodium aluminate, potassium aluminate, etc. from which a substantial majority of the alkali metal has been removed leaving only the alumina with a relatively minor amount of the alkali metal present.

The desired support, preferably, although not necessarily, gamma-, eta- or theta-alumina, is pretreated with a promoter of the type hereinbefore set forth in any manner known in the art. One method of impregnating the solid support is to treat said support with a solution containing an alkali metal hydroxide or alkali metal salt such as potassium hydroxide, lithium hydroxide, lithium nitrate, etc., drying the resulting composite and thereafter calcining said promoted support at a temperature usually in the range of from about 500° to about 700° C.

The alkali metal amide which is used to impregnate the promoted metal oxide support of the type hereinbefore set forth in greater detail is prepared by dissolving an alkali metal such as potassium in liquid ammonia and thereafter impregnating the promoted alumina with an ammonia solution of potassium amide, the potassium amide having been formed when the potassium reacted with the ammonia. Heretofore the main difficulty which was observed in the preparation of supported alkali metal amide catalysts such as potassium amide on the promoted support was the poor distribution of the potassium amide on the alumina. This is due to the inherently low solubility of potassium amide in ammonia which is aggravated by locally low temperatures caused by uneven ammonia evaporation. When preparing the desired catalyst, the ammonia is usually driven off following the impregnation of the alkali metal amide on the promoted support. Heretofore the ammonia has been driven off by depressurizing the reaction vessel which caused a relatively fast cooling of the vessel during the evaporation of the liquid ammonia. As the temperature decreased, the potassium amide precipitated locally thus resulting in a spotty catalyst which was non-uniform due to the fact that the potassium amide was not distributed evenly over the surface of the promoted support.

In contradistinction to this method it has now been discovered that an alkali metal amide composited on a promoted alumina support may be prepared in a manner whereby the finished catalyst will contain the alkali metal amide in an even distribution on the surface of the promoted alumina support, said catalyst then possessing a higher degree of hydrocarbon conversion activity than do catalysts which have been prepared by conventional means. The improvement in this process comprises increasing the amount of ammonia present during the impregnation step in an excess within the range of from about 15 moles of ammonia per mole of potassium amide to about 25 moles of ammonia per mole of potassium amide. This excess of ammonia will insure the solution of all of the amide. In addition, during the evaporation of the excess ammonia the pressure of the reaction vessel is maintained at a constant rate, said vessel being maintained under a pressure within the range of from about 200 to about 400 p.s.i. This constant pressure is maintained by heating the reaction vessel to within the range of from about 35° to about 100° C., the temperature being dependent upon the rate of evaporation. Inasmuch as the rate of precipitation of the alkali metal amide on the promoted support is proportional to the rate of evaporation of the excess ammonia, the aforementioned rate of precipitation is easily controlled by controlling the heat input, thereby maintaining a constant pressure. It is also contemplated within the scope of this invention that any means known in the art outside of controlling the heat input may be utilized to maintain an even and constant pressure. The result of maintaining a constant and controlled rate of evaporation of excess ammonia will be the preparation of a finished catalyst in which the alkali metal amide is evenly distributed in a uniform manner on the surface of the promoted alumina support, said catalyst, as hereinbefore set forth, possessing a relatively high degree of conversion activity, and particularly polymerization activity, as compared to other catalysts which have not been prepared in this manner. Examples of alkali metal amides which may be utilized to prepare catalysts according to the process of this invention include potassium amide, sodium amide, lithium amide, rubidium amide and cesium amide, the preferred amides comprising potassium amide and sodium amide due to the relatively large amount of these metals which are readily available and the correspondingly lower cost of the same.

The following examples are given to illustrate the process of the present invention which, however, are not intended to limit the generally broad scope of the present invention in strict accordance therewith.

*Example I*

A promoted gamma-alumina base was prepared by treating precalcined halide-free alumina spheres with lithium nitrate solution equal to 0.3 wt. percent of lithium based on the weight of the alumina. The promoted alumina was dried and thereafter calcined for 4 hours at a temperature of about 680° C. with air. The promoted alumina support was then cooled utilizing a high surface sodium-dried nitrogen stream.

To prepare the potassium amide, a bar of potassium was placed in a potassium pot. The potassium was under an organic solvent to prevent air from reaching the surface of the potassium. The organic solvent was purged with pentane and the pentane displaced with dried nitrogen. Following this, 5 g. of ferric oxide was placed in an autoclave. Liquid ammonia was passed through the potassium pot to dissolve the potassium therein. The potassium amide which formed was passed through the autoclave containing the ferric oxide which acted as a promoter. Following this, the potassium amide was charged to a kiln containing the lithiated alumina. The liquid ammonia was allowed to evaporate from the kiln, the temperature of the kiln during evaporation being about 35.5° C. while the pressure of the kiln during evaporation was about 70 p.s.i. The kiln was allowed to depressurize for a period of about 20 hours. The general appearance of the catalyst disclosed a non-uniform gray color.

*Example II*

In this example a catalyst was prepared according to the process of this invention. The promoted base was prepared by impregnating gamma-alumina with a lithium nitrate solution following which the composite was dried and calcined for 4 hours at 680° C. in the presence of air.

A bar of potassium was placed in a potassium pot along with an organic solvent used to keep air away from the surface of the potassium. The organic solvent was purged with n-pentane which was subsequently displaced with dried nitrogen. An ammonia pot was filled with condensed ammonia vapors which had been dried prior to purging said condensed vapors to the pot. A kiln containing the promoted alumina support was hooked into the system. Liquid ammonia was passed through the potassium pot and through the ammonia tank into the kiln. Following the addition of the amide, an additional amount of liquid ammonia was added to the kiln to increase the solubility of the amide and thus improve the distribution of the amide on the promoted gamma-alumina. The kiln was sealed and the pressure during the ammonia evaporation step was controlled at about 250 p.s.i.g. by heating the kiln to a temperature of about 45°–60° C. At the end of the evaporation of the ammonia which occurs when the pressure falls to about 10 p.s.i.g., the evaporation of the ammonia was discontinued and the temperature of the kiln raised to about 150° C. This catalyst, when examined, will be found to have a uniform appearance being grayish-black to black in color.

*Example III*

Another conversion catalyst was prepared by promoting a gamma-alumina support by the addition of lithium thereto. Ammonia gas was condensed in a flask along with calcined ferric oxide as a promoter. The flask was maintained at the reflex temperature of ammonia and potassium was added to the flask in small increments. Upon completion of the reaction, the resultant solution of potassium amide in liquid ammonia was purified into another vessel containing the promoted alumina. The excess ammonia was removed by evaporated from the mixture while continuously stirring the same.

*Example IV*

The three catalysts which were prepared according to the above examples were used to polymerize propylene, the catalyst prepared according to Example I being designated as "A"; the catalyst prepared according to Example II being designated as "B"; and the catalyst prepared according to Example III being designated as "C." Each catalyst was charged to the polymerization unit under dry nitrogen. The reactor comprised a stainless steel tube containing approximately 50 cc. of catalyst. The system was pressured with dry nitrogen followed by a purge with n-pentane. The charge stock comprised propylene and n-pentane at an overall liquid hourly space velocity of about 2.0. The polymerization of the propylene was effected at temperatures ranging from about 140°–152° C. and a pressure ranging from 1800–2000 p.s.i.g. The results of these runs are set forth in Table I below.

TABLE I

| Conversion Activity Percent | A | B | C |
| --- | --- | --- | --- |
| 140° C | 44 | 59 | 32 |
| 152° C |  | 74 | 56 |

The desired isomer comprising 2-methyl-2-pentene was the major hexene isomer present to the extent of 66–70%. As will be seen from the above table, the catalyst which was prepared according to the process of this invention, namely, catalyst B, exhibited a considerably higher conversion activity than did either catalyst A or catalyst C which were prepared in the manner heretofore utilized in preparing catalysts of this nature, i.e., alkali metal amides disposed on promoted alumina supports. By utilizing an excess of liquid ammonia to insure greater solubility of the potassium amide and also by maintaining the kiln under pressure while allowing evaporation of the ammonia to take place, a more uniform distribution of potassium amide on the surface of the promoted alumina was effected which permitted the finished catalyst to possess the desired higher conversion activity.

We claim as our invention:

1. A process for the preparation of a catalyst which comprises promoting a substantially anhydrous, high surface area alumina support by impregnation with a compound selected from the group consisting of the salts and hydroxides of the alkali metals and alkaline earth metals, calcining the resultant promoted support, thereafter impregnating said promoted support with an alkali metal amide dissolved in an excess of liquid ammonia in an amount of from about 15 to about 25 moles of ammonia per mole of said amide, evaporating the excess ammonia at an elevated temperature of from about 35° to about 100° C. and a substantially constant pressure in the range of from about 200 to about 400 p.s.i., and recovering the catalyst comprising an alkali metal amide disposed on a promoted substantially anhydrous, high surface area alumina support.

2. The process of claim 1 further characterized in that said support is gamma-alumina and the first-mentioned impregnating compound is lithium nitrate.

3. The process of claim 1 further characterized in that said support is gamma-alumina and the first-mentioned impregnating compound is lithium hydroxide.

4. The process of claim 1 further characterized in that said alkali metal amide is potassium amide.

References Cited by the Examiner

UNITED STATES PATENTS

| 3,148,157 | 9/1964 | Pollitzer et al. | 252—438 |
| 3,154,595 | 10/1964 | Donaldson et al. | 252—438 |
| 3,163,612 | 12/1964 | Meisinger et al. | 252—438 |

MILTON WEISSMAN, *Primary Examiner.*

OSCAR R. VERTIZ, *Examiner.*

A. J. GREIF, R. M. DAVIDSON, *Assistant Examiners.*